United States Patent
Murata et al.

(10) Patent No.: US 9,085,001 B2
(45) Date of Patent: Jul. 21, 2015

(54) ELECTROSTATIC COATING SYSTEM, SPRAY GUN FOR ELECTROSTATIC COATING, AND ALTERNATING POWER SOURCE UNIT

(75) Inventors: Masami Murata, Owariasahi (JP);
Tatsuya Nishio, Owariasahi (JP);
Satoshi Yamasaki, Owariasahi (JP);
Teruo Ando, Owariasahi (JP)

(73) Assignee: ASAHI SUNAC CORPORATION, Owariasahi-Shi, Aichi (JP)

( * ) Notice: Subject to any disclaimer, the term of this patent is extended or adjusted under 35 U.S.C. 154(b) by 608 days.

(21) Appl. No.: 13/500,780

(22) PCT Filed: Sep. 27, 2010

(86) PCT No.: PCT/JP2010/066689
§ 371 (c)(1),
(2), (4) Date: Jun. 14, 2012

(87) PCT Pub. No.: WO2011/043211
PCT Pub. Date: Apr. 14, 2011

(65) Prior Publication Data
US 2012/0240851 A1 Sep. 27, 2012

(30) Foreign Application Priority Data
Oct. 9, 2009 (JP) ................................. 2009-235224

(51) Int. Cl.
*B05B 5/025* (2006.01)
*B05B 5/053* (2006.01)
(Continued)

(52) U.S. Cl.
CPC . *B05B 5/03* (2013.01); *B05B 5/053* (2013.01); *B05B 5/0533* (2013.01);
(Continued)

(58) Field of Classification Search
CPC ........ B05B 5/0535; B05B 5/03; B05B 5/053; B05B 5/0533; B05B 5/10; B05B 12/004; H02H 7/003
USPC .................. 118/621, 300, 707; 239/690–691, 239/704–706; 361/225, 233
See application file for complete search history.

(56) References Cited

U.S. PATENT DOCUMENTS 2,955,565 A * 10/1960 Schotland ...................... 118/696
3,764,883 A 10/1973 Staad et al.
(Continued)

FOREIGN PATENT DOCUMENTS

| JP | 3-63086 | 6/1991 |
| JP | 4-105559 | 4/1992 |

(Continued)

OTHER PUBLICATIONS

First Notification of Reasons for Refusal issued in corresponding Chinese patent application No. 201080046512.1, dated May 27, 2014 (in Chinese w/English translation).
(Continued)

*Primary Examiner* — Dah-Wei D Yuan
*Assistant Examiner* — Binu Thomas
(74) *Attorney, Agent, or Firm* — Smith, Gambrell & Russell, LLP

(57) ABSTRACT

The disclosed electrostatic coating system (1) includes a spray gun (2) for electrostatic coating, a high-voltage generator (5), and an alternating-current source unit (4), and further includes a removable grounding member (7), in a state attached to the main body of the gun, provided to close an open-circuit portion (3c) of the grounded power source line (3a), and a control circuit (8) for controlling the alternating current source unit (4) by detecting the current flowing through the power source line (3) or the voltage of the power source line (3) by a current coil (13) to stop application of the alternating voltage (Vac) to the high-voltage generator (5) when the detected electric current or the detected voltage has dropped or either the current or the voltage is not detected during supply of the alternating voltage (Vac) to the high voltage generator (5) of the spray gun (2). This system enables prevention of charging of the removable grounding member (7) to improve the safety in the coating operation.

9 Claims, 11 Drawing Sheets

(51) Int. Cl.
*B05B 5/03* (2006.01)
*H02H 7/00* (2006.01)
*B05B 12/00* (2006.01)
*B05B 5/10* (2006.01)
*B05B 7/08* (2006.01)
*B05B 15/06* (2006.01)

(52) U.S. Cl.
CPC ............... *B05B 5/0535* (2013.01); *B05B 5/10* (2013.01); *B05B 7/0815* (2013.01); *B05B 12/004* (2013.01); *B05B 15/061* (2013.01); *H02H 7/003* (2013.01)

(56) References Cited

U.S. PATENT DOCUMENTS

| | | | |
|---|---|---|---|
| 3,937,401 A * | 2/1976 | Luderer et al. | 239/707 |
| 3,971,337 A * | 7/1976 | Hastings | 118/629 |
| 4,120,017 A * | 10/1978 | Sickles | 361/228 |
| 4,143,819 A * | 3/1979 | Hastings | 239/707 |
| 4,186,886 A * | 2/1980 | Sickles | 239/690.1 |
| 4,737,887 A * | 4/1988 | Thome | 361/228 |
| 5,044,564 A * | 9/1991 | Sickles | 239/690.1 |
| 5,058,812 A * | 10/1991 | Cox et al. | 239/691 |
| 5,222,664 A | 6/1993 | Noakes et al. | |
| 5,584,931 A * | 12/1996 | Buhlmann | 118/628 |
| 5,647,543 A * | 7/1997 | Ma | 239/706 |
| 5,685,482 A * | 11/1997 | Sickles | 239/3 |
| 6,758,424 B2 * | 7/2004 | Lind et al. | 239/690 |
| 7,552,882 B2 * | 6/2009 | Matsumoto et al. | 239/707 |
| 7,748,651 B2 | 7/2010 | Amari et al. | |
| 7,926,433 B2 * | 4/2011 | Preston | 112/117 |
| 2007/0039546 A1 * | 2/2007 | Amari et al. | 118/629 |
| 2009/0229517 A1 * | 9/2009 | Ko | 118/696 |

FOREIGN PATENT DOCUMENTS

| | | |
|---|---|---|
| JP | 5-131160 | 5/1993 |
| JP | 2003093928 A | 4/2003 |
| JP | 2003-164777 | 6/2003 |
| JP | 2005-349306 | 12/2005 |

OTHER PUBLICATIONS

International Search Report for PCT/JP2010/066689 mailed Dec. 28, 2010 in English and Japanese.

* cited by examiner

US 9,085,001 B2

1

ELECTROSTATIC COATING SYSTEM, SPRAY GUN FOR ELECTROSTATIC COATING, AND ALTERNATING POWER SOURCE UNIT

TECHNICAL FIELD

The present invention relates to an electrostatic coating system including an electrostatic coating spray gun which sprays electrically charged coating material into an object to be coated and an alternating-current (AC) power supply generating alternating current, an electrostatic coating spray gun constituting the electrostatic coating system and an alternating power source unit constituting the electrostatic coating system.

BACKGROUND ART

Methods of coating bodies of automobile vehicles include an electrostatic coating. In the electrostatic coating, a high voltage is applied between an object to be coated (vehicle body or the like) and the coating apparatus to thereby form an electrostatic field (electric line of force) and coating material particle is charged and sprayed. As a result, a coating material is adsorbed to the object by an electrostatic attractive force.

As one the above-described electrostatic coating apparatuses, Patent Document 1 discloses an electrostatic coating spray gun which has an electrode provided in a coating material flow path of a gun body. High voltage is supplied to the electrode so that high voltage is applied between the electrode and the object and coating material particle is charged.

PRIOR ART DOCUMENT

Patent Document

Patent document 1: JP-A-2005-349306

SUMMARY OF THE INVENTION

Problem to be Overcome by the Invention

The electrostatic coating spray gun is incorporated with a high voltage generator having a high voltage generating circuit. High voltage generated by the high voltage generator is applied to the electrode. Accordingly, when incorporating a large-sized high voltage generator or a high-spec high voltage generator in order that a charging efficiency of coating material particle and accordingly, a coating efficiency of the coating material may be improved, the electrostatic coating spray gun is accordingly rendered large-sized and heavily weighed. Furthermore, in order that high voltage may be maintained, some distance needs to be ensured between a part of the electrostatic coating spray gun where the electrode is provided (a distal end of the gun body, generally) and a grounded part of the spray gun (a grip provided on the rear end of the gun body, generally).

Under the foregoing circumstances, the electrostatic coating spray gun generally tends to be rendered large-sized and heavily-weighed in the construction. Accordingly, a further size reduction and weight reduction have been desired for the electrostatic coating spray gun.

In order that the above problem may be overcome, an electrostatic coating spray gun has been considered in which an electrically conductive grounding member is disposed near the electrode with a space from the electrode and that the grounding member is grounded via a grounding path.

2

According to thus constructed electrostatic coating spray gun, the charging efficiency of coating material particle is enhanced by an electric field formed between the electrode and the grounding member, whereupon the coating efficiency of the coating material can be improved. As a result, the coating material can be charged (static electrification) to the same level as in conventional electrostatic coating spray guns even when the voltage generated by the high voltage generator is rendered lower.

Since the voltage generated by the high voltage generator can be rendered lower, the grounded conductive grounding member can be disposed near the electrode to which high voltage is supplied, with no problem, whereby the distance between the grounding member and the electrode can be rendered shorter. Furthermore, the structure that the grounding member is disposed near the electrode so as to be spaced from the electrode is compact and can reduce the size and weight of the electrostatic coating spray gun.

The grounding member as mentioned above needs to be reliably maintained at a ground potential so as not to be electrically charged. When the charged grounding member comes closer to or contacts a grounded object located around the grounding member, there is a danger that electrostatic discharge occurs with the result that a circumjacent explosive gas (such as gasified organic solvent contained in the coating material) would be ignited.

In order that the grounding member may reliably be maintained at a ground potential, a structure is suggested that the grounding member cannot be detached from the electrostatic coating spray gun, namely, the grounding member is normally connected in a ground path. However, since the coating material adheres to the grounding member with coating, the grounding member needs to be cleaned. For this purpose, when the grounding member is configured so as not to be detached from the electrostatic coating spray gun, it becomes difficult to clean the grounding member, which reduces the workability in the cleaning.

On the other hand, the grounding member can easily be cleaned when the grounding member is configured to be detachable from the electrostatic coating spray gun. However, there is a possibility that attachment is rendered less reliable when the grounding member cleaned is attached to the electrostatic coating spray gun. In this case, the grounding member cannot be maintained at the ground potential. Furthermore, there is a case where the grounding member is detached from the electrostatic coating spray gun during the coating. In this case, too, the grounding member cannot be maintained at the ground potential. Accordingly, when the grounding member is merely configured to be detachable from the electrostatic coating spray gun, there is a possibility that the grounding member cannot reliably be maintained at the ground potential, resulting in an accident ignition of an explosive gas with charge of the grounding member.

An object of the present invention is to provide an electrostatic coating system which can reliably prevent the grounding member from being charged during the coating work even when the grounding member is configured to be detachably attachable, an electrostatic coating spray gun constituting the electrostatic coating system, and an alternating power source unit constituting the electrostatic coating system.

Means for Overcoming the Problem

An electrostatic coating system according to the present invention includes an electrostatic coating spray gun atomizing an electrically charged coating material and applying the atomized coating material to an object to be coated and an alternating-current (AC) power supply generating AC voltage, the electrostatic coating spray gun comprising a gun body made of a non-conductive material; a high voltage generation unit generating a direct-current (DC) high voltage based on the AC voltage supplied thereto via an AC voltage supply line from the AC power supply; an electrode to which the DC high voltage generated by the high voltage generating unit is applied, thereby charging the coating material to be atomized; and a grounding member detachably attached to the gun body and provided so as to be spaced from the electrode when attached to the gun body, the grounding member having a conductive property such that the grounding member generates an electric field between the electrode to which the DC high voltage is applied and the grounding member, the AC power supply comprising a detection unit which detects a current flowing via the AC voltage supply line or voltage of the AC voltage supply line; a control unit which controls supply of the alternating current voltage via the AC voltage supply line to the high voltage generation unit, based on the detected current or detected voltage, wherein the AC voltage supply line includes a ground side supply line to which grounding is applied, the ground side supply line including a part formed with an open circuit; the grounding member is configured to close the open circuit when attached to the gun body; and the control unit is configured to stop supply of the AC voltage to the high voltage generation unit when the detected current or the detected voltage is reduced while supplying the AC voltage to the high voltage generation unit or when the current or the voltage is not detected.

An electrostatic coating spray gun according to the invention atomizes an electrically charged coating material and applies the atomized coating material to an object to be coated and constitutes an electrostatic coating system together with an alternating-current (AC) power supply generating AC voltage, the spray gun comprising a gun body made of a non-conductive material; a high voltage generation unit generating a direct-current (DC) high voltage based on the AC voltage supplied thereto via an alternating voltage supply line from the AC power source unit; an electrode to which the DC high voltage generated by the high voltage generating unit is applied, thereby charging the coating material to be atomized; and a grounding member detachably attached to the gun body and provided so as to be spaced from the electrode when attached to the gun body, the grounding member having a conductive property such that the grounding member generates an electric field between the electrode to which the DC high voltage is applied and the grounding member, wherein the AC voltage supply line includes a ground side supply line to which grounding is applied, the ground side supply line including a part formed with an open circuit; and the grounding member is configured to close the open circuit when attached to the gun body.

An alternating current power source unit according to the invention generates an alternating-current (AC) voltage and constitutes an electrostatic coating system together with an electrostatic coating spray gun provided with a high voltage generation unit generating a direct-current (DC) high voltage based on the AC voltage supplied thereto via an AC voltage supply line from the AC power supply, the power source unit comprising a detection unit which detects a current flowing via the AC voltage supply line or voltage of the AC voltage supply line; a control unit which controls supply of the AC voltage via the AC voltage supply line to the high voltage generation unit, based on the detected current or detected voltage, wherein the control unit is configured to stop supply of the AC voltage to the high voltage generation unit when the detected current or the detected voltage is reduced while supplying the AC voltage to the high voltage generation unit or when the current or the voltage is not detected.

Effect of the Invention

According to the above-described electrostatic coating system, the grounding member of the electrostatic coating spray gun is configured to be detachably attachable to the gun body and closes the open circuit of the ground side supply line to which grounding is applied, when attached to the gun body. Accordingly, when attachment of the grounding member to the gun body is uncertain, the current flowing through the AC voltage supply line or the voltage of the AC voltage supply line is reduced. Furthermore, when the grounding member is detached from the gun body, no current flows through the AC voltage supply line and accordingly, no voltage is generated at the AC voltage supply line.

On the other hand, the control unit of the AC power source unit stops supply of AC voltage to the high voltage generation unit when the detected current or voltage has been reduced during supply of AC voltage to the high voltage generating unit of the electrostatic coating spray gun or when attachment of the grounding member to the gun body is uncertain. The control unit of the AC power source unit further stops the supply of AC voltage to the high voltage generation unit when no current or voltage is detected, that is, when the grounding member has been detached from the gun body.

Thus, even in the case where the grounding member is configured to be detachably attachable, supply of the AC voltage to the high voltage generation unit is stopped when attachment of the grounding member to the gun body is uncertain or when the grounding member has been detached from the gun body. This can reliably prevent the grounding member from being electrically charged during the coating work, improving the safety in the coating work.

According to the above-described electrostatic coating spray gun, the grounding member is configured to be detachably attachable to the gun body and the grounding member attached to the gun body is configured to close the open circuit formed in the part of the ground side supply line to which grounding is applied. Accordingly, when constituting the electrostatic coating system together with the AC power supply according to the invention, the electrostatic coating spray gun can reliably prevent the grounding member from being electrically charged during the coating work, improving the safety in the coating work.

According to the above-described alternating current power source unit, supply of AC voltage to the high voltage generation unit is stopped when the detected current or voltage is reduced during supply of AC voltage to the high voltage generation unit. The supply of AC voltage to the high voltage generation unit is also stopped when no current or voltage is detected. Accordingly, when constituting the electrostatic coating system together with the electrostatic coating spray gun according to the invention, the AC power supply can reliably prevent the grounding member from being electrically charged during the coating work, improving the safety in the coating work.

BEST MODE FOR CARRYING OUT THE INVENTION

First Embodiment

A first embodiment according to the present invention will be described with reference to FIGS. 1 to 10.

Figure 1:
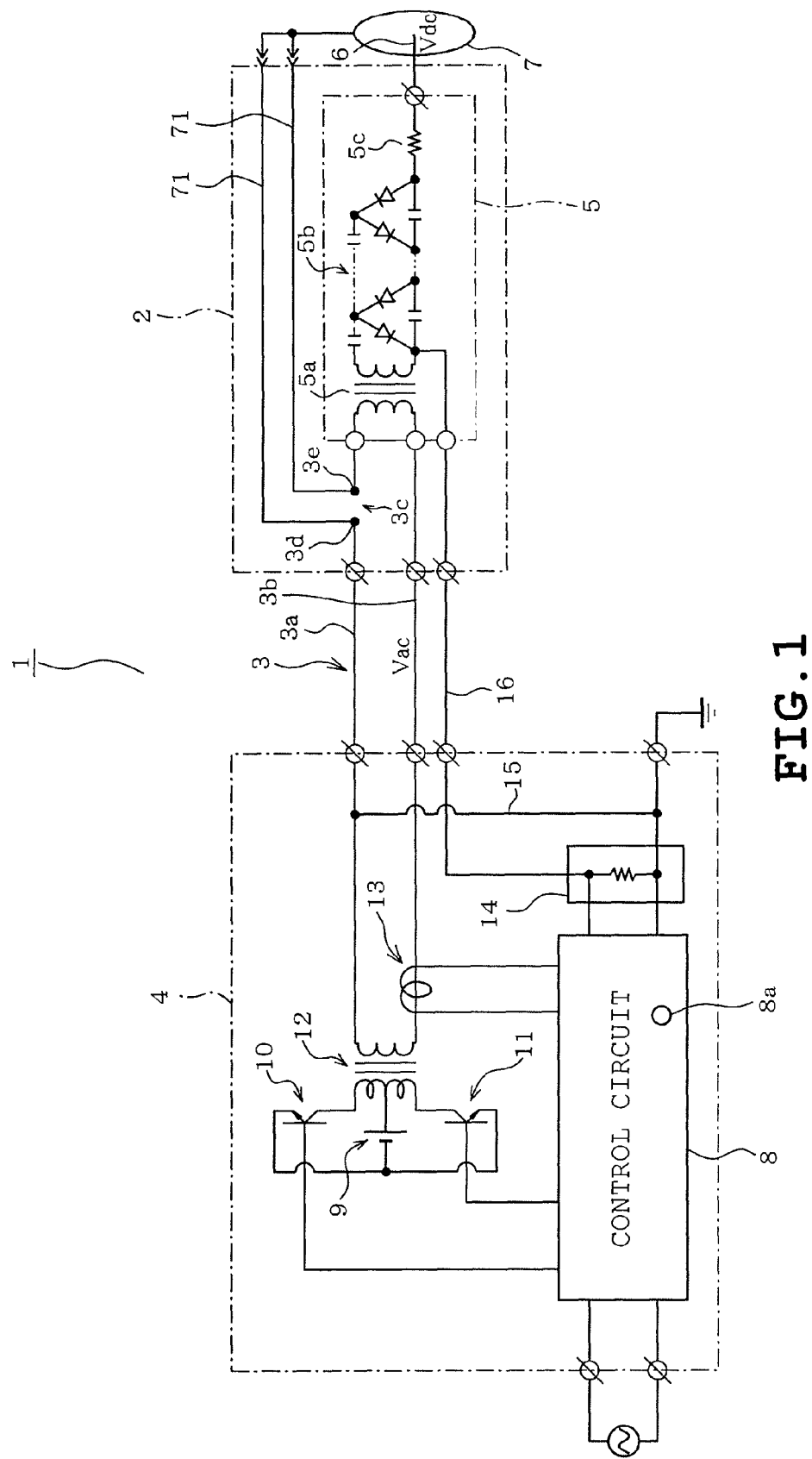
FIG. 1 is a diagram showing an electrical arrangement of the electrostatic coating system according to a first embodiment.

Referring to FIG. 1, an electrical arrangement of the electrostatic coating system 1 of the first embodiment is schematically shown. The electrostatic coating system 1 includes an electrostatic coating spray gun 2 (hereinafter, "spray gun 2") atomizing electrically charged coating material and coating an object to be coated with the charged coating material, and an alternating-current (AC) power supply 4 which supplies AC voltage $V_{ac}$ via a power supply line 3 (serving as an AC voltage generation unit).

The spray gun 2 includes a high voltage generator 5 (serving as a high voltage generation unit), a pin electrode 6 and a grounding ring 7 (serving as a grounding member).

The high voltage generator 5 is a cascade-type high voltage generator including a step-up transformer 5a constituting a high voltage generating circuit, a high voltage rectifier circuit 5b (a Cockcroft-Walton voltage doubler rectifier circuit, for example) and an output resistance 5c all of which are molded into an integral device. The high voltage generator 5 generates a DC high voltage $V_{dc}$ based on an AC voltage $V_{ac}$ supplied thereto from the AC power supply 4. The DC high voltage Vdc generated by the high voltage generator 5 is applied to the pin electrode 6 so that a coating material to be atomized from the spray gun 2 is charged with the DC high voltage $V_{dc}$, as will be described later. The grounding ring 7 is made of stainless steel, for example and has electrical conductivity. The grounding ring 7 is detachably attachable to a gun body 21 (see FIGS. 2 and 3) of the spray gun 2 and is separated from the pin electrode 6 when attached to the gun body 21, as will be described later. The grounding ring 7 generates electric fields between itself and the pin electrode 6 to which the DC high voltage is applied from the high voltage generator 5, as will be described later. The electrical arrangement of the spray gun 2 has briefly been described above, and the spray gun 2 will be described in more detail later.

An arrangement of the AC power supply 4 will now be described. The AC power supply 4 generates AC voltage $V_{ac}$ and includes a control circuit 8 (serving as a control unit), a DC power supply 9 (DC 20V, in this case), two switching elements 10 and 11, an output transformer 12, a current coil 13 (serving as a detection unit) and a safety circuit 14.

Output of the DC power supply 9 is connected via the switching elements 10 and 11 to a power supply ground at a primary side of the output transformer 12. More specifically, the DC power supply 9 has an output terminal which is connected so as to constitute a positive side relative to a ground potential by the output transformer 12 and the switching element 10 and so as to constitute a negative side relative to the ground potential by the output transformer 12 and the switching element 11.

The switching elements 10 and 11 comprise semiconductor switches (transistors, in this case) respectively and conduction states of the switching elements 10 and 11 are controllable when the switching elements 10 and 11 are energized. The switching elements 10 and 11 are turned on when energized and the switching elements 10 and 11 are turned off when de-energized. ON/OFF of the switching elements 10 and 11 is controlled by the control circuit 8. The control circuit 8 mainly comprises a microcomputer provided with a CPU, a ROM and a RAM none of which are shown. The control circuit 8 generates pulsed drive signals according to energization times (ON times) of the switching elements 10 and 11, supplying the drive signals to the switching elements 10 and 11, respectively.

Energization states (ON/OFF states) of the switching elements 10 and 11 are changed in conjunction with the respective drive signals supplied from the control circuit 8, whereby output of the DC power supply 9 is switched between the positive and negative sides. The drive signals are supplied in such a timing that the ON states of the switching elements 10 and 11 do not overlap each other. When the switching elements 10 and 11 are alternately turned on/off repeatedly according to pulse widths of the drive signals, a low AC voltage $V_{ac}$ (AC 24V/20 kHz) according to an output voltage of the DC power supply 9 is generated at the secondary side of the output transformer 12. The AC voltage $V_{ac}$ is supplied via the power supply line 3 to the high voltage generator provided in the spray gun 2.

The power supply line 3 includes a pair of power supply lines 3a and 3b to supply the AC voltage $V_{ac}$ to the high voltage generator 5. The power supply line 3a (serving as a ground side supply line) is grounded via a grounding wire 15 at the AC power supply 4 side thereby to be configured to be maintained at the ground voltage. On the other hand, the power supply line 3b is configured so that a potential thereof varies relative to the power supply line 3a. An open circuit 3c is formed at a part (a part of the power supply line 3a provided in the spray gun 2, in this case) of the power supply line 3a. A pair of power-supply and grounding paths 71 (See FIGS. 2 and 3) are connected to the open circuit 3c as will be descried later.

The current coil 13 is provided on the power supply line 3b that is not maintained at the ground potential. The control circuit 8 detects a current (a current flowing through the power supply line 3b) flowing through the power supply line 3 by the current coil 13. Based on the current detected by the current coil 13, the control circuit 8 is configured to control supply of the AC voltage $V_{ac}$ to the high voltage generator 5. The control contents of the control circuit 8 will be described later.

The safety circuit 14 is connected via a current detection cable 16 to the high voltage rectifier circuit 5b of the high voltage generator 5. The safety circuit 14 is provided for detecting a magnitude of electrical current flowing in the high voltage generator 5, via the current detection cable 16. The control circuit 8 detects a current flowing in the high voltage generator 5 by the safety circuit 14. When determining that an overcurrent has flowed in the high voltage generator 5, the control circuit 8 carries out a process of stopping supply of AC voltage $V_{ac}$ via the power supply line 3 to the spray gun 2 or another process.

Figure 2:
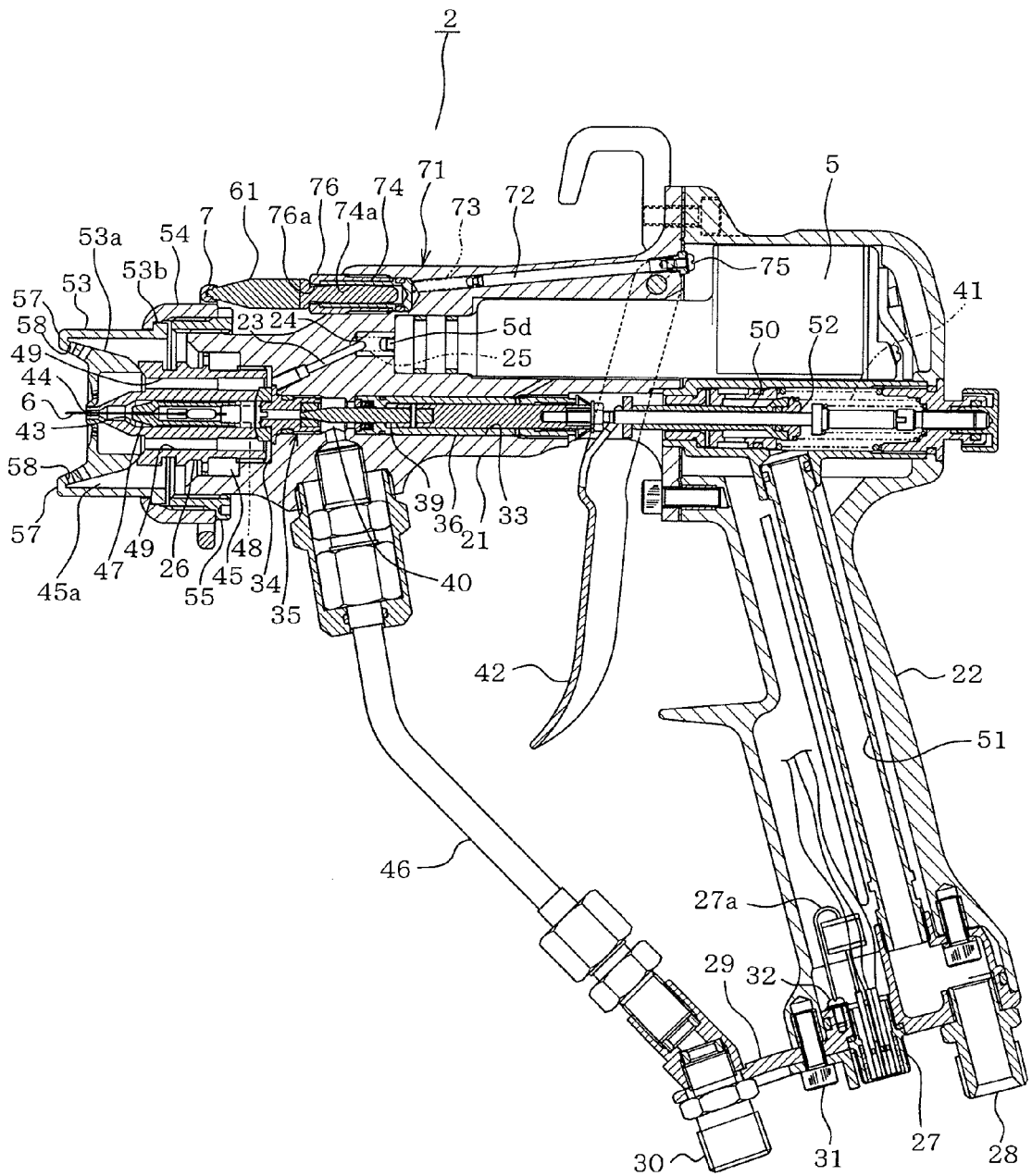
FIG. 2 is a longitudinal side section of an entire construction of the electrostatic coating spray gun.

As shown in FIG. 2, the construction of the spray gun 2 will now be described in detail with reference to FIGS. 2 to 9. The spray gun 2 includes a gun body 21 and a grip 22 provided on a rear end (a right end as viewed in FIG. 2). The gun body 21 is made of a synthetic resin (a non-conductive material) such as a polyacetal resin having electrical insulation properties or a fluorine resin and constitutes a gun barrel of the spray gun 2. The above-described high voltage generator 5 is incorporated in a space defined between the gun body 21 and the grip 22.

A continuum bar 23 with electrical conductivity is mounted on a front interior of the gun body 21 so as to extend forward in a downwardly inclined state. A hole 24 is formed in a front of the high voltage generator 5 so that a rear part of the continuum bar 23 is exposed in the hole 24. An electrically conductive spring 25 is accommodated in the hole 24. The spring 25 has a rear which is attached to an output terminal 5d projecting from a front end of the high voltage generator 5. The spring 25 has a front which is in abutment with the continuum bar 23. The gun body 21 has a front on which is provided a coating material nozzle 26 having the pin electrode 6. The continuum bar 23 and the pin electrode 6 are configured to be electrically connected together as will be described later.

On the other hand, the grip 22 is made of, for example, a resin material containing metal fiber or metal powder and accordingly has an electrical conductivity. To the underside of the grip 22 are mounted a power supply connector 27 and an air hose joint 28, and a cylindrical coating material hose joint 30 is connected via a connecting member 29 to the underside of the grip 22.

The connecting member 29 is fixed to the lower end of the grip 22 by a screw 31. Each of the connecting member 29 and the screw 31 is made of an electrically conductive material. A screw 32 is connected via a lead wire 27a to a ground wire of the power supply connector 27 and is threadingly engaged with the connecting member 29.

A high-frequency voltage necessary for high voltage generation or the AC voltage $V_{ac}$ supplied from the AC power supply 4 is taken from a power supply connector 27 provided in the lower part of the grip 22 thereby to be supplied to the step-up transformer 5a of the high voltage generator 5. The supplied AC voltage $V_{ac}$ is boosted by the step-up transformer 5a and is thereafter further boosted and rectified simultaneously to be converted via the output resistance to a DC high voltage $V_{dc}$ (about 30 kV). The DC high voltage $V_{dc}$ generated by the high voltage generator 5 is introduced from the output terminal 5d via the spring 25 to the continuum bar 23 to be applied to the pin electrode 6. The high voltage rectifier circuit 5b can set or render the polarity of the output voltage to positive (+) or negative (−) relative to the ground potential by changing the direction of the diode in the circuit. In the case of the embodiment, the polarity of output voltage of the high voltage rectifier circuit 5b is adapted to be negative relative to the ground potential. Accordingly, in this case, the high voltage generator 5 applies DC high voltage $V_{dc}$ (−30 kV) of negative polarity to the pin electrode 6.

Furthermore, a hole 33 extending in the front-back direction is formed in the lower interior of the gun body 21. The gun body 21 has a front end formed with a mounting recess 34. The hole 33 is open in a rear end surface of the mounting recess 34. A coating material valve 35 is provided in a front interior of the hole 33. A hollow guide member 36 is provided in the rear of the coating material valve 35 with a space being defined therebetween.

Figure 3:
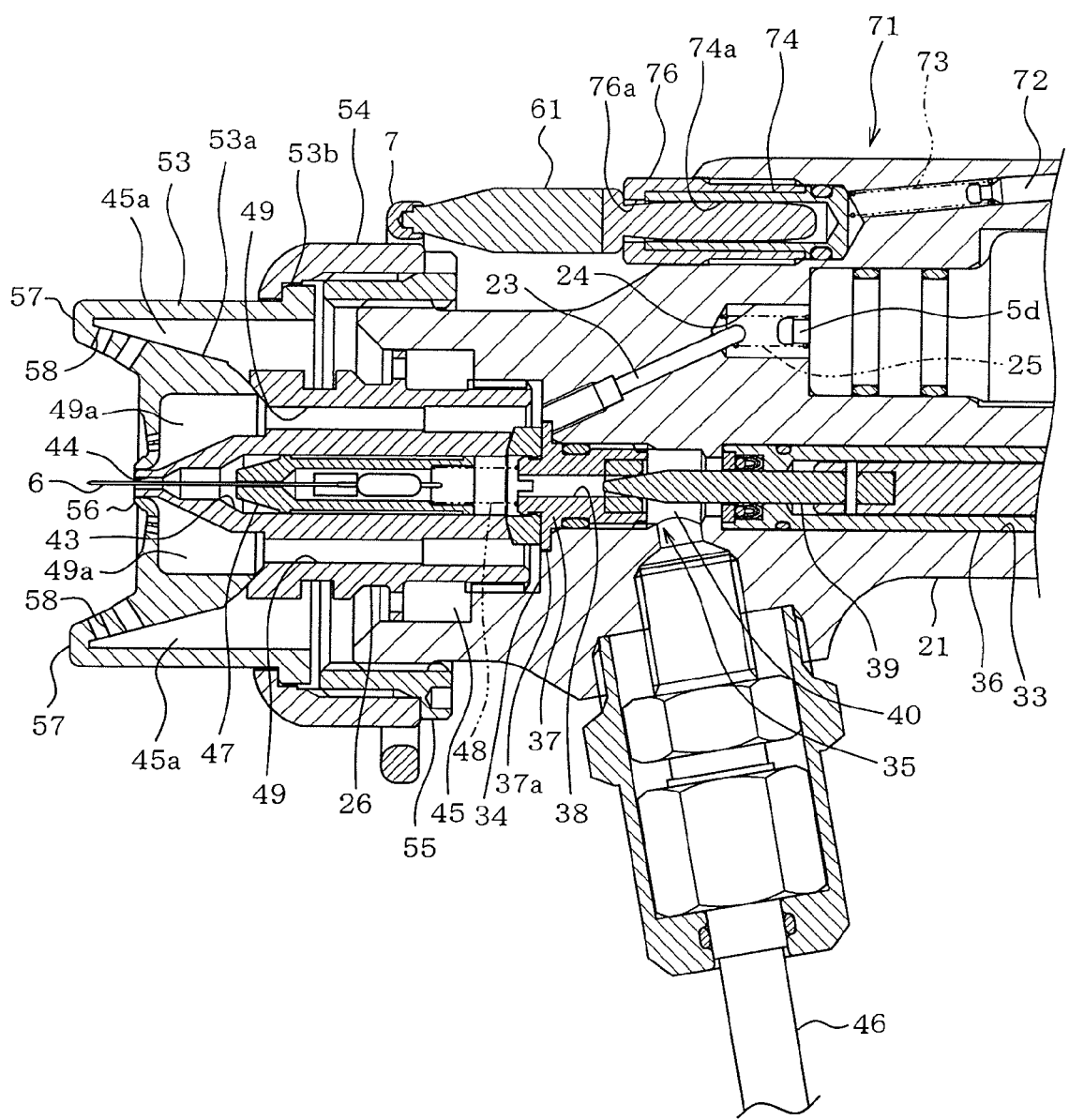
FIG. 3 is an enlarged longitudinal side section of a distal end part of the electrostatic coating spray gun.

The coating material valve 35 includes a valve body 37 with electrical conductivity, a valvular orifice 38 axially extending through the valve body 37 and a needle 39 opening and closing the valvular orifice 38 as shown in FIG. 3. The valve body 37 has a front further having an outer periphery on which an annular flange 37a is formed integrally therewith. The flange 37a and a distal end of the continuum bar 23 are adapted to contact with each other.

The space of the hole 33 defined between the coating material valve 35 and the guide member 36 serves as a valve chest 40. The needle 39 has a front end formed into a tapered shape and extends through the valve chest 40. The needle 39 has a rear extending through the guide member 36 so as to be moved along the guide member 36 in the front-back direction. The valvular orifice 38 is closed when the front end of the needle 39 abuts on the valvular orifice 38. The valvular orifice 38 is opened when the front end of the needle 39 is separated therefrom.

The needle 39 is biased by a return spring 41 (see FIG. 2) in a direction such that the valvular orifice 38 is normally closed (leftward as viewed in FIG. 2). The needle 39 is moved rearward against the return spring 41 only while a trigger 42 provided on the gun body 21 is pulled to the grip 22 side, whereby the valvular orifice 38 is opened.

A rear half of the mounting recess 34 has a smaller diameter than a front half thereof as shown in FIG. 2. The coating material nozzle 26 is threadingly engaged with the smaller diameter portion so as to be detachably attachable. The coating material nozzle 26 is made of an electrically insulative synthetic resin. The coating material nozzle 26 includes a front half protruding in front of the mounting recess 34. A coating material flow path 43 is provided in the coating material nozzle 26 so as to extend through the central interior of the nozzle 26 in the front-back direction. The coating material flow path 43 includes a rear end communicating with the valvular orifice 38 (see FIG. 3) of the coating material valve 35. The coating material nozzle 26 has a front end including a part which corresponds to a front end of the coating material flow path 43 and has a smaller diameter to serve as a coating material discharge opening 44. When the coating material nozzle 26 is attached to the mounting recess 34, an annular space is defined around the coating material nozzle 26. The annular space is used as a patterned air flow path 45.

A coating material (a solvent-based coating material, for example) stored in a coating material source (a coating material tank, for example) is supplied through a non-conductive coating material hose (not shown) to the coating material hose joint 30, being introduced through a coating material tube 46 into the valve chest 40. When the trigger 42 is non-operating, the coating material introduced into the valve chest 40 is prevented from being discharged to the coating material nozzle 26 by the needle 39 closing the valvular orifice 38. On the other hand, when the trigger 42 is operated thereby to open the coating material valve 35, the coating material supplied into the valve chest 40 is discharged into the coating material flow path 43 in the coating material nozzle 26.

The pin electrode 6 is inserted through the coating material flow path 43. The pin electrode 6 has a front end which projects through the coating material discharge opening 44 so as to be located in front of the coating material discharge opening 44. Furthermore, the pin electrode has a rear end which is held in the interior of a holding member 47 made of a non-conductive material. An electrically conductive spring 48 is accommodated in a part of the interior of the coating material flow path 43 located in the rear of the holding member 47. The spring 48 has a rear end in abutment with the front end surface of the valve body 37. The pin electrode 6 and the valve body 37 are electrically connected via the spring 48 to each other as the result of the above-described construction. The DC high voltage $V_{dc}$ generated by the high voltage generator 5 is introduced from the output terminal 5d via the spring 25 to the continuum bar 23, being applied via the valve body 37 and the spring 48 to the pin electrode 6.

A plurality of atomization air flow path 49 is formed around the coating material flow path 43 in the coating material nozzle 26. The atomization air flow path 49 have respective front ends communicating with an annular atomization air flow path 49a (see FIG. 3) provided in the front end of the coating material nozzle 26.

The gun body 21 has a rear end provided with an air valve 50 (see FIG. 2). An air flow path 51 is defined in the grip 22 so as to connect between the air hose joint 28 and the air valve 50. Compressed air for atomization air and patterned air is supplied from a compressed air generator via a high-pressure air hose neither shown into the air hose joint 28, being introduced through the air flow path 51 into the air valve 50.

The air valve 50 is configured to be opened and closed by a valve element 52 moved forward and backward together with the needle 39. More specifically, the air valve 50 is opened when the coating material valve 35 is opened, and the air valve 50 is closed when the coating material valve 35 is closed. When the air valve 50 is opened, compressed air is supplied into an atomization air supply path provided in the gun body 21 and the patterned air flow path 45 neither shown to be supplied into the atomization air flow path 49 of the coating material nozzle 26 and the patterned air flow path 45.

The coating material nozzle 26 has a front end is covered by an air cap 53 which is mounted on a front end of the gun body 21 and is made of an insulating resin (polyacetal, for example). The air cap 53 has a central back surface provided with a fitting protrusion 53a. The fitting protrusion 53a is fitted with the front end of the coating material nozzle 26. The air cap 53 has a rear outer periphery provided with an annular stepped portion 53b (see FIG. 3). A retaining nut 54 made of an insulating resin (polyacetal, for example) has a distal end which is engaged with the annular stepped portion 53b. The retaining nut 54 is threadingly engaged with the front end of the gun body 21 via an annular fixing member 55 thereby to be fixed in position.

The air cap 53 is fitted with the front end of the coating material nozzle 26 after the coating material nozzle 26 has been inserted into the mounting recess 34. The fixing member 55 and the retaining nut 54 are inserted from the front end of the air cap 53 and threadingly engaged with each other, whereby the fixing member 55 and the retaining nut 54 are fixed to the gun body 21 together with the air cap 53. In this case, an annular space is defined between the air cap 53 and the gun body 21 so as to be located around the coating material nozzle 26. The space is used not only as the patterned air flow path 45a but also as the patterned air flow path 45.

The air cap 53 has a centrally located atomization air exhaust hole 56 (see FIG. 3) formed therethrough. The coating material discharge opening 44 of the coating material nozzle 26 is inserted into the atomization air exhaust hole 56. The atomization air exhaust hole 56 communicates with the atomization air flow path 49a. Atomization air supplied into the atomization air flow path 49a is discharged forward through an annular gap between an inner periphery of the atomization air exhaust hole 56 and an outer periphery of the coating material discharge opening 44.

Furthermore, the air cap 53 has a front end surface formed with a pair of forwardly protruding corners 57 located at upper and lower portions with the atomization air exhaust hole 56 being interposed therebetween, respectively. Each one of the corners 57 has a plurality of (two, for example) patterned air discharge holes 58 communicating with the patterned air flow path 45a. The patterned air discharge holes 58 are inclined obliquely forward toward the central axis of the patterned air flow path 45a. Accordingly, patterned air as compressed air supplied to the patterned air flow path 45a is discharged obliquely forward from the patterned air discharge holes 58.

Figure 4:
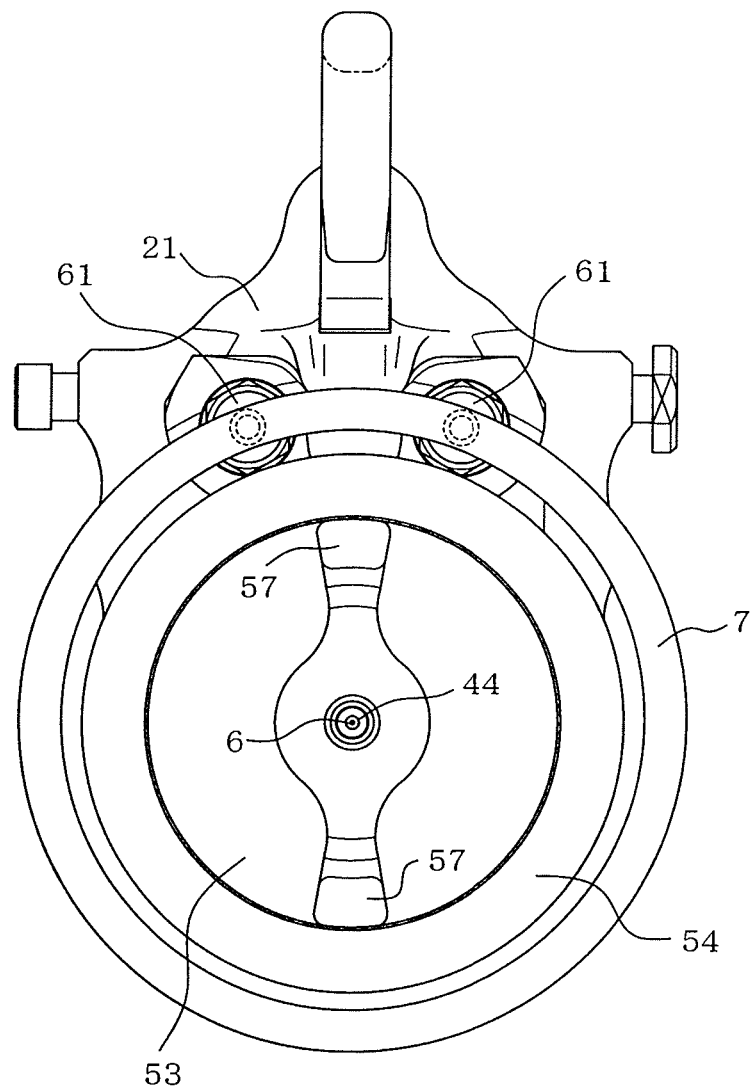
FIG. 4 is a front view of the distal end part of the electrostatic coating spray gun.
Figure 5:
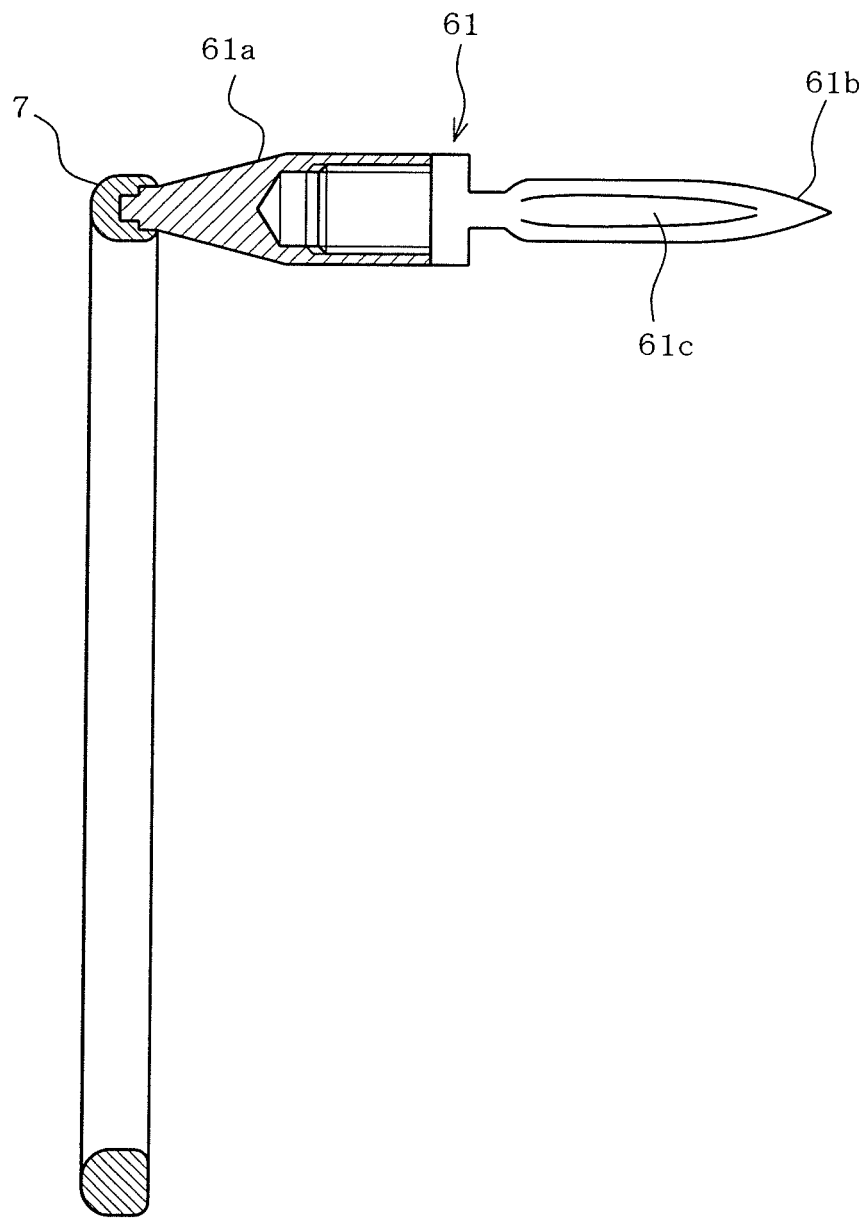
FIG. 5 is a longitudinally sectional side view of the grounding ring.

The aforementioned ground ring 7 is detachably attached to the outer periphery of the air cap 53. The construction of the ground ring 7 will now be described with reference to FIGS. 4 and 5. The ground ring 7 is disposed as an annular electrically conductive member about the coating material discharge opening 44 as shown in FIG. 4. Furthermore, the ground ring 7 has a front end which is formed so as to have a substantially semi-circular section and a rear end which is formed so as to have a generally rectangular section, as shown in FIG. 5.

A pair of rearwardly (rightward as viewed in FIG. 5) protruding connecting terminals 61 (serving as connecting portions) are fixed to an upper rear surface thereof. The connecting terminals 61 are made of stainless steel along with the ground ring 7 and accordingly electrically conductive. Each connecting terminal 61 includes a proximal end member 61a fixed to the ground ring 7 and a distal end member 61b screwed into the proximal end member 61a. Each distal end member 61b has a plurality of pressing portions 61c which are formed in a peripheral portion thereof so as to extend axially with respect to the distal end member 61b and project radially with respect to the distal end member 61b. More specifically, each distal end member 61b is formed into the shape of a banana plug.

A pair of power feeding and grounding paths 71 are provided in an upper part of the gun body 21 as shown in FIGS. 2 and 3. Each power feeding and grounding path 71 functions both as a power feeding path through which AC voltage $V_{ac}$ is supplied to the high voltage generator 5 and as a grounding path for grounding the ground ring 7.

The construction of the power feeding and grounding paths 71 will now be described. The power feeding and grounding paths 71 include a pair of shafts 72 made of a metal (aluminum, for example), a pair of springs made of a metal (stainless steel, for example) and a pair of sockets 74 (serving as connecting portions), respectively.

The shafts 72 are buried in the upper part of the gun body 21 so as to be slightly inclined forwardly downward in the front-back direction (or slightly inclined rearwardly upward). The shafts 72 have rear ends which are adapted to be fixed to the upper rear surface (where the high voltage generator 5 is accommodated) of the gun body 21 by metal screws 75 (see also FIG. 7A), respectively. Each shaft 72 thus provided is covered by the gun body 21.

The springs 73 have rear ends fitted with the front ends of the shafts 72 respectively. Accordingly, the springs 73 are buried in the upper part of the gun body 21 so as to be slightly inclined forwardly downward in the front-back direction (or slightly inclined rearwardly upward).

The sockets 74 have insertion holes 74a which extend in the front-back direction and into which the upper front end portions of the gun body 21 are inserted thereby to be supported, respectively. The springs 73 have front ends which are adapted to contact with the upper rear end portions of the gun body 21, respectively. As a result, the sockets 74 are electrically connected via the springs 73 to the shafts 72 respectively. The sockets 76 have distal ends which are covered by a pair of holders 76 made of a resin (polyacetal resin, for example) respectively. The holders 76 have centrally located through holes 76a respectively. As a result, the insertion holes 74a of the sockets 74 are forwardly open without being closed.

The paired connecting terminals 61 of the ground ring 7 are inserted into the insertion holes 74a of the sockets 74 respectively. As a result, the sockets 74 are electrically connected to the ground ring 7. In this case, furthermore, the pressing portions 61c (see FIG. 5) of the connecting terminals 61 press inner surfaces of the insertion holes 74a of the sockets 74 respectively. As a result, the ground ring 7 is detachably attached to the gun body 21. More specifically, the attachment of the ground ring 7 onto the gun body 21 is effected by the fitting of the connecting terminals 61 at the ground ring 7 side and the sockets 74 at the gun body 21 side. In the attached state, the ground ring 7 is located so as to be spaced from the pin electrode 6. A pressing force each pressing portion 61c applies to the insertion hole 74a of the socket 74 is desirably set to such a magnitude that the user cannot pull the ground ring 7 (pressing portions 61c) unless the user consciously exerts a force on the ground ring 7 (the pressing portions 61c).

Figure 6:
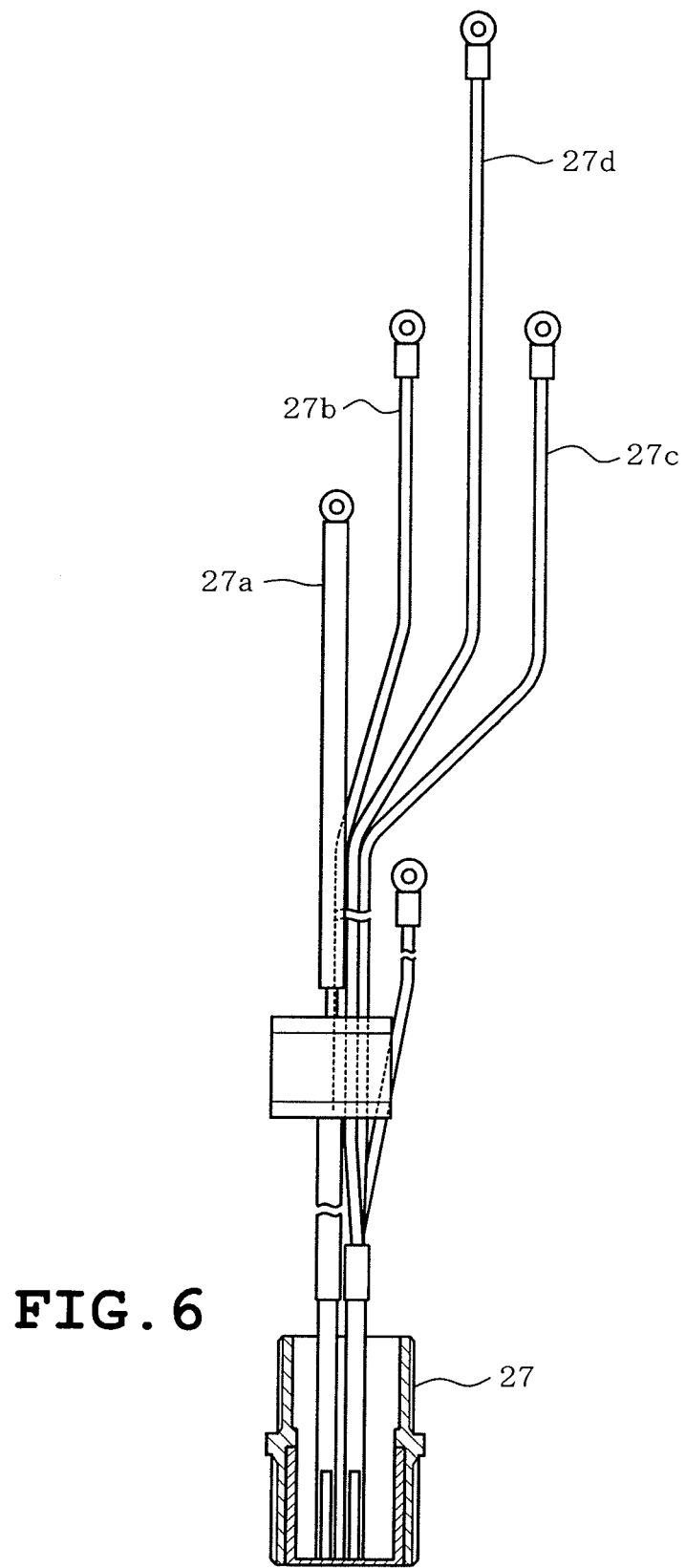
FIG. 6 shows a configuration of a power source connector.

The following describes wiring in the spray gun 2 or in particular, the connection of the high voltage generator 5, the power supply connector 27 and the paired power feeding and grounding paths 71 with reference to FIGS. 6 and 7.

Figure 7A:
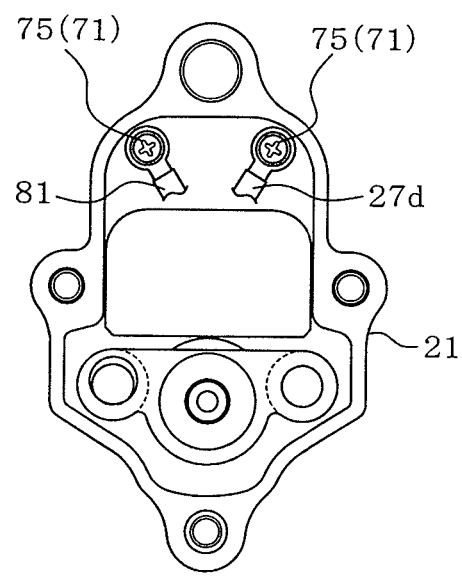
FIGS. 7A and 7B illustrate a rear of the gun body and a rear face of the high voltage generation unit incorporated in the electrostatic coating spray gun respectively.
Figure 7B:
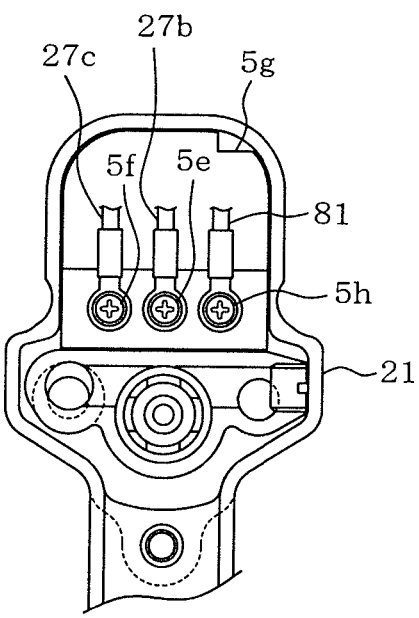
Figure 8:
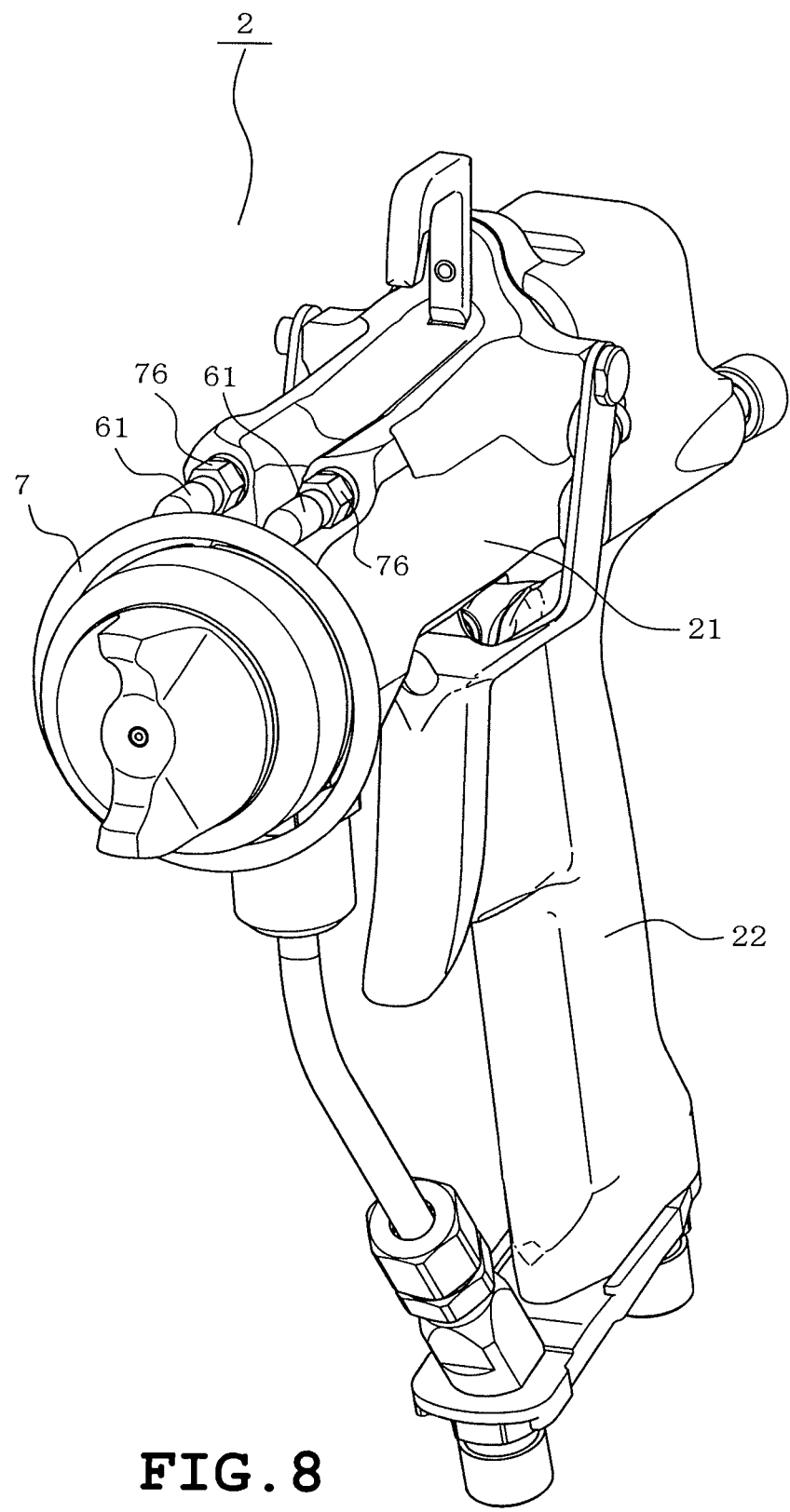
FIG. 8 is a perspective view of the electrostatic coating spray gun with the grounding ring being attached to the electrostatic coating gun.
Figure 9:
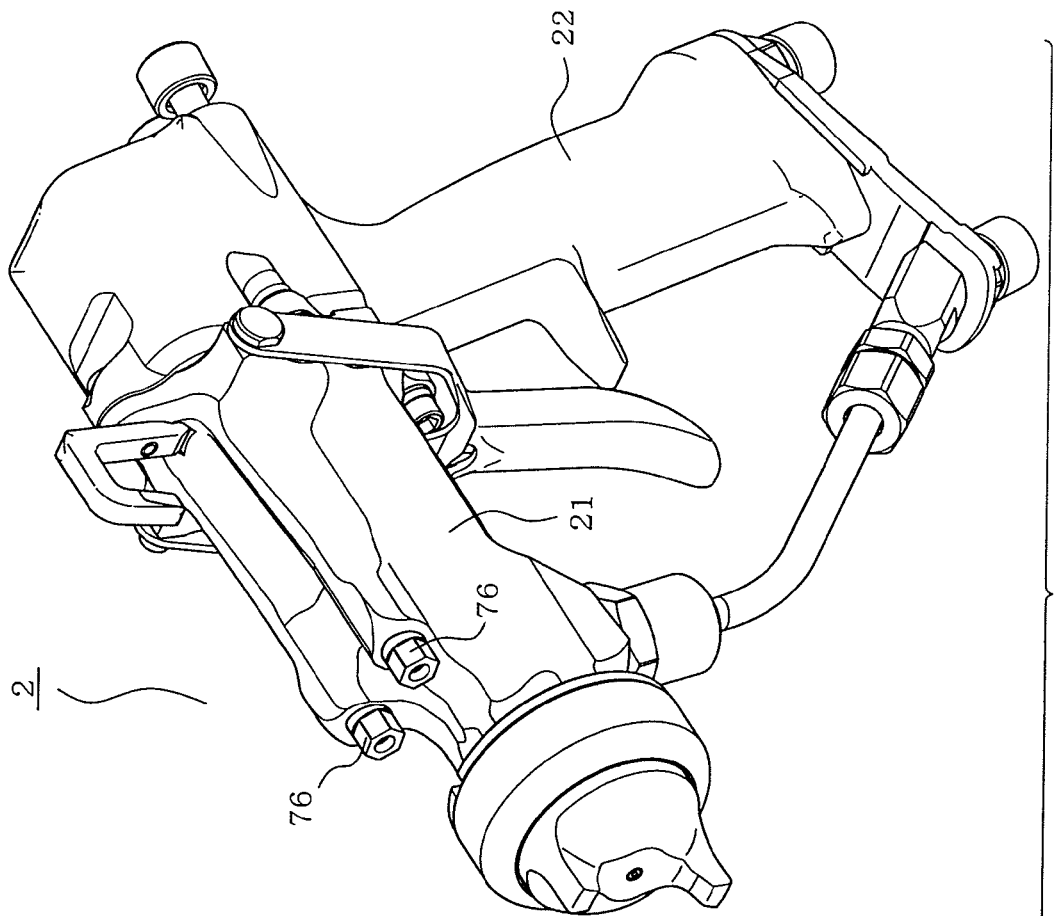
FIG. 9 is a perspective view of the electrostatic coating spray gun with the grounding ring being detached from the gun body.
Figure 9:
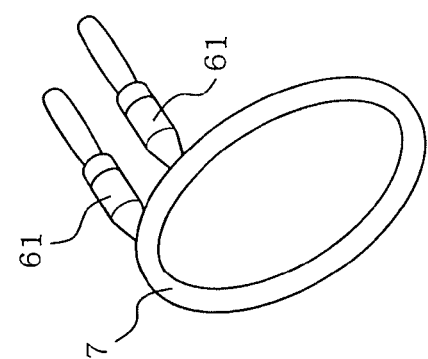

The power supply connector 27 includes a power feeding wire 27b, a current detecting wire 27c and a grounding wire 27d in addition to the aforementioned lead wire 27a. The power feeding wire 27b constitutes a part (provided inside the spray gun 2) of the power supply line 3b (see FIG. 1) and is connected to a power feeding terminal 5e provided on the rear surface of the high voltage generator 5 as shown in FIG. 7B. The current detecting wire 27c constitutes a part (provided inside the spray gun 2) of the current detecting cable 16 (see FIG. 1) and is connected to a current detecting terminal 5f provided on the rear surface of the high voltage generator 5 as shown in FIG. 7B. The grounding wire 27d is a part (provided inside the spray gun 2 and located nearer the AC power supply 4 than the open circuit 3c) of the power supply line 3a (see FIG. 1). The grounding wire 27d is connected via the screw 75 to a proximal end of one power feeding and grounding path 71 (the shaft 72) as shown in FIG. 7A. The other power feeding and grounding path 71 (the shaft 72) has a proximal end to which a ground wire 81 is connected via a screw 75. The ground wire 81 constitutes a part (provided inside the spray gun 2 and located nearer the high voltage generator 5 side than the open circuit 3c) of the power supply line 3a (see FIG. 1). A notch 5g (see FIG. 7B) is provided in an upper part of the high voltage generator 5, and the ground wire 81 is connected through the notch 5g to a grounding terminal 5h provided on the rear surface of the high voltage generator 5. The open circuit 3c of the power supply line 3a is formed by a connecting point between the proximal end of one power feeding and grounding path 71 and the grounding wire 27d and a connecting point 3e (see FIG. 1) between the proximal end of the other power feeding and grounding path 71 and the grounding wire 81. The paired sockets 74 constituting the distal ends of the power feeding and grounding paths 71 are connected to both ends of the open circuit 3c of the power supply line 3a.

In the spray gun 2 constructed as described above, when the grounding ring 7 has been attached to the gun body 21 (see FIG. 8), the grounding ring 7 is adapted to be connected via the power feeding and grounding paths 71 (the sockets 74, springs 73 and shafts 72) to the power supply line 3a. In this state, the grounding ring 7 closes the open circuit 3c of the power supply line 3a grounded and is grounded via the conductive power feeding and grounding paths 71 and the power supply line 3a maintained at the ground potential. More specifically, the grounding ring 7 attached to the gun body 21 constitutes a part of the power supply line 3a. On the other hand, the spray gun 2 is configured so that the open circuit 3c of the power supply line 3a is opened when the grounding ring 7 has been detached from the gun body 21 (see FIG. 9).

The following describes the operation in the case where electrostatic coating is carried out by the use of the electrostatic coating system described above. An object (not shown) to be coated is grounded and is at the same potential (ground potential) as the AC power supply 4 and the like. The object thus grounded serves as a positive electrode while the pin electrode 6 serves as a negative electrode.

When the trigger 2 is pulled to the grip 22 side, the coating material valve 35 is opened such that the coating material (solvent-based coating material) supplied from the coating material hose joint 30 is discharged into the coating material flow path 43. The coating material is discharged from the coating material discharge opening 44 along the surface of the pin electrode 6 in the form of coating. Furthermore, compressed air is supplied to the atomization air path and flows through the narrow space between the inner periphery of the atomization air exhaust hole 56 and the outer periphery of the coating material discharge opening 44 thereby to be discharged forward. Consequently, the coating material discharged along the surface of the pin electrode 6 from the coating material discharge opening 44 is atomized by the atomization air.

Furthermore, when the trigger 42 is pulled to the grip 22 side, AC voltage $V_{ac}$ is supplied from the AC power supply unit 4 via the power supply line 3 (power supply lines 3a and 3b) to the high voltage generator 5. The DC high voltage $V_{dc}$ (−30 kV, in this case) generated by the high voltage generator 5 is introduced from the output terminal 5d via the springs 25 and the continuum bar 23 to the valve body 37. The DC high voltage $V_{dc}$ introduced to the valve body 37 is supplied from the front end of the valve body 37 via the springs 48 to the pin electrode 6. As a result, a strong electric field (electric line of force) is generated between the pin electrode 6 to which DC high voltage $V_{dc}$ has been applied and the grounding ring 7 maintained at the ground potential such that a corona discharge field is established, whereupon electric charge is induced to the coating material flowing along the pin electrode 6. Accordingly, coating material particles discharged from the coating material discharge opening 44 and atomized by the atomization air fly into the air (ahead of the spray gun 2) in the electrically-charged state.

The coating material particles flown into the air are formed by the patterned air discharged from the patterned air discharge hole 58 into an atomization pattern suitable for coating (an elliptical or oval shape, in this case).

The coating material particles are mainly conveyed near the object by the patterned air. When charged coating material particles come close to the object, electric charge with a polarity opposed to the electric charge of the coating material particles is induced on the surface of the grounded object by electrostatic induction. As a result, an electrostatic force acts between the coating material particles and the object, so that the coating material particles are subjected to an attractive force directed to the object. More specifically, the coating material particles are coated on the surface of the object by the attractive force and a spraying force of the patterned air. Since the attractive force due to the electrostatic force acts, the coating material particles are also coated on the back side of the object which does not face the spray gun 2. The electrostatic coating is carried out for the object by the above-described action.

The inventors conducted an experiment in which electrostatic coating was carried out using the spray gun of the embodiment. The conductive grounding ring 7 grounded was spaced from the pin electrode 6 or the grounding ring 7 was disposed near the pin electrode 6 so as to be separate from the pin electrode 6. It was confirmed that the coating efficiency of the coating material was obviously improved as compared with the use of a conventional spray gun provided with no grounding ring 7. The reason for this is considered as follows.

More specifically, the grounding ring 7 is electrically connected via the power feeding and grounding paths 71 to the power supply line 3a maintained at the ground potential. Accordingly, the grounding ring 7 is maintained at the ground potential. Moreover, the grounding ring 7 is located nearer the pin electrode 6 than the object does.

When the DC voltage Vdc generated by the high voltage generator 5 is applied to the pin electrode 6 in the above-described construction, an electric field is established between the pin electrode 6 and the grounding ring 7 and enhances electric discharge of the coating material particles. Consequently, the coating efficiency of the coating material can be improved.

Figure 10:
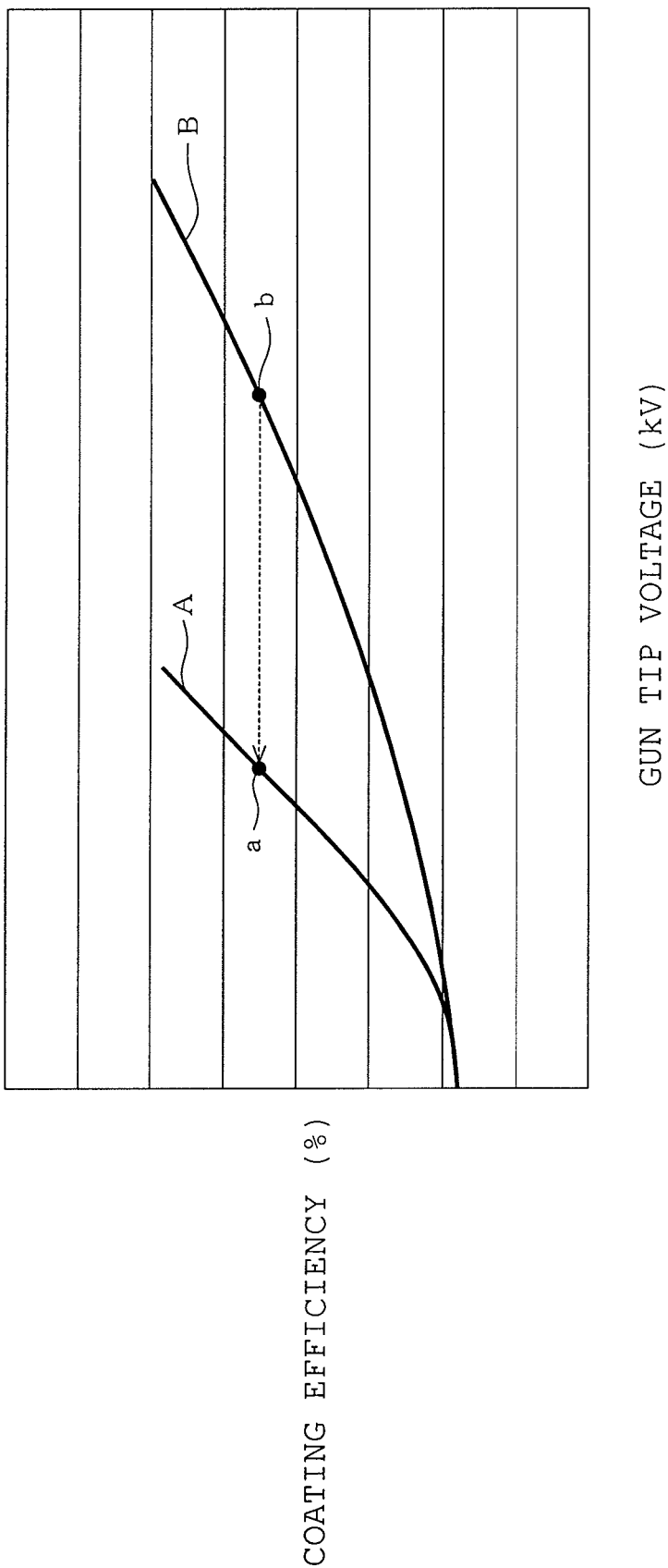
FIG. 10 is a graph showing the relationship between voltage applied to the electrode and the coating efficiency of the coating material.

FIG. 10 schematically shows the relationship between output voltage (gun tip voltage) applied to the pin electrode 6 and the coating efficiency of coating material, the relationship being obtained by the experiment conducted by the inventors. In FIG. 10, solid line A denotes the spray gun 2 of the embodiment provided with the grounding ring 7, and solid line B denotes the conventional spray gun provided with no grounding ring.

As obvious from FIG. 10, the spray gun 2 of the embodiment (see solid line A) can achieve the same coating efficiency as the convention spray gun (see solid line B) at a lower gun tip voltage. More specifically, for example, the spray gun 2 (solid line A) of the embodiment can achieve the same coating efficiency as the point b (gun tip voltage of about 60 kV, in this case) of the conventional spray gun (solid line B), at point a (gun tip voltage of 30 kV, in this case).

Additionally, the experiment conducted by the inventors confirms that the charging efficiency of coating material particles and accordingly coating efficiency of coating material are improved as the diameter of the grounding ring 7 is rendered smaller.

Another experiment conducted by the inventors further confirms that the improved coating efficiency of the coating material is maintained at a higher value but does not easily reduce by disposing the grounding ring 7 so that the grounding ring 7 is spaced by a predetermined range from the distal end of the coating material discharge opening 44. The reason for this is considered as follows.

The grounding ring 7 of the spray gun 2 is still clean (coating material does not adhere to the grounding ring 7) immediately after start of electrostatic coating by the electrostatic coating system 1. Accordingly, the coating efficiency of coating material can be improved by the above-described action (electric charge of coating material particles is enhanced by the electric field established between the pin electrode 6 and the grounding ring 7).

However, part of the charged coating material is attracted by the grounding ring 7 maintained at the ground potential, thereby adhering to the grounding ring 7. Accordingly, with lapse of time from start of electrostatic coating, the coating material gradually adheres to the grounding ring 7 such that the grounding ring 7 is covered with the coating material.

When the coating material adheres to the surface of the grounding ring 7, the electric field concentrates on a slightly left exposed portion of the grounding ring 7 (the portion where the coating material does not adhere) and a portion having a thinner coating film, whereupon the discharge current is increased in these portions. This increase in the discharge current drops the gun tip voltage (output voltage of the pin electrode 6) and reduces, as a direct cause, the coating efficiency of coating material.

However, when the grounding ring 7 is disposed so as to be spaced by a predetermined range from the distal end of the coating material discharge opening 44, the grounding ring 7 is sufficiently and suitably separate in the predetermined range from the distal end of the coating material discharge opening 44. Accordingly, even when the coating material adheres to the grounding ring 7, the discharge current can be suppressed to a low value (not more than 70 µA, in this case). Consequently, the reduction in the coating efficiency of coating material can be avoided.

The control contents of the control circuit 8 in the above-described electrostatic coating system 1 will be described.

The grounding ring 7 of the spray gun 2 is configured to be detachably attachable to the gun body 21. When having been attached to the gun body 21, the grounding ring 7 closes the open circuit 3c of the grounded power supply line 3a. Accordingly, an amount of current flowing via the power supply line 3 (power supply lines 3a and 3b) is decreased when the attachment of the grounding ring 7 to the gun body 21 or the contact of the connecting terminal 61 with the socket 74 is uncertain, the amount of current flowing through the power supply line 3 (the power lines 3a and 3b) is reduced. Furthermore, no current flows through the power supply line 3 (the power lines 3a and 3b) when the grounding ring 7 is completely detached from the gun body 21 or when the connecting terminal 61 is out of contact with the socket 74.

On the other hand, the control circuit 8 of the AC power supply 4 is configured to detect current flowing through the power supply line 3 (the power line 3b) by the current coil 13 at intervals of a predetermined time (4 msec.). The control circuit 8 is configured to immediately stop the supply of AC voltage $V_{ac}$ to high voltage generator 5 when a detection current (the current which flows through the power line 3b and is detected by the current coil 13) reduces during supply of AC voltage $V_{ac}$ to the high voltage generator 5 of the spray gun 2, that is, when the attachment of the grounding ring 7 to the gun body 21 is uncertain. Various manners can be employed to determine whether or not the detection current has been reduced. For example, the determination can be made based on the comparison of the detection current with a threshold, a reduction rate of the detection current (an amount of current reduced for a predetermined period of time) or a reduction rate of the detection current.

The control circuit 8 of the AC power supply 4 is further configured to immediately stop the supply of AC voltage $V_{ac}$ to the high voltage generator 5 when no current (the current flowing through the power line 3b) is detected by the current coil 13 or when the grounding ring 7 is completely detached from the gun body 21 and no current flows into the power supply line 3 (power lines 3a and 3b).

When the control circuit 8 has stopped the supply of AC voltage $V_{ac}$ to the high voltage generator 5 of the spray gun 2, the user can check whether the grounding ring 7 is attached to the gun body 21 and re-attach the grounding ring 7. Subsequently, when a reset switch 8a (see FIG. 1; and serving as a return unit) of the control circuit 8 is operated by the user, the control circuit 8 re-starts the supply of AC voltage $V_{ac}$ to the high voltage generator 5. Additionally, when the detection current is reduced after return to the power supply state or when no current is detected, the control circuit 8 is configured to immediately stop the supply of AC voltage $V_{ac}$ to the high voltage generator 5 again.

According to the above-described embodiment, the grounding ring 7 is detachably attachable to the gun body 21 of the spray gun 2. Even in this case, the supply of AC voltage $V_{ac}$ to the high voltage generator 5 is immediately stopped when the attachment of the grounding ring 7 to the gun body 21 is uncertain or when the grounding ring 7 has been detached from the gun body 21. Consequently, the grounding ring 7 can reliably be prevented from being electrically charged during the coating work, whereby the safety of the coating work can be improved.

Furthermore, the AC power supply 4 is provided with the reset switch 8a for re-starting the supply of AC voltage $V_{ac}$ to the high voltage generator 5. The coating system is configured so that after stop of the supply of AC voltage $V_{ac}$, the power supply to the spray gun 2 is not re-started unless the user consciously operates the reset switch 8a. Accordingly, the supply of AC voltage $V_{ac}$ to the high voltage generator 5 is not automatically re-started under the condition where the attachment of the grounding ring 7 is uncertain, whereupon the safety of the coating work can further be improved.

Furthermore, the grounding ring 7 is provided with the paired conductive connecting terminals 61. The gun body 21 is provided with the paired sockets 74 connected to both ends of the open circuit 3c of the power line 3a which is maintained at the ground potential, respectively. The spray gun 2 is configured so that the attachment of the grounding ring 7 to the gun body 1 is carried out by fitting the connecting terminals 61 with the respective sockets 74. This construction is simple, and the grounding ring 7 can be configured to be detachably attachable without complicating the structure.

Furthermore, the connecting terminals 61 have the pressing portions 61c which press the inner surfaces of the insertion holes 74a of the sockets 74 respectively. Consequently, the grounding ring 7 attached can be prevented from being pulled out while being detachably attachable.

Second Embodiment

Figure 11:
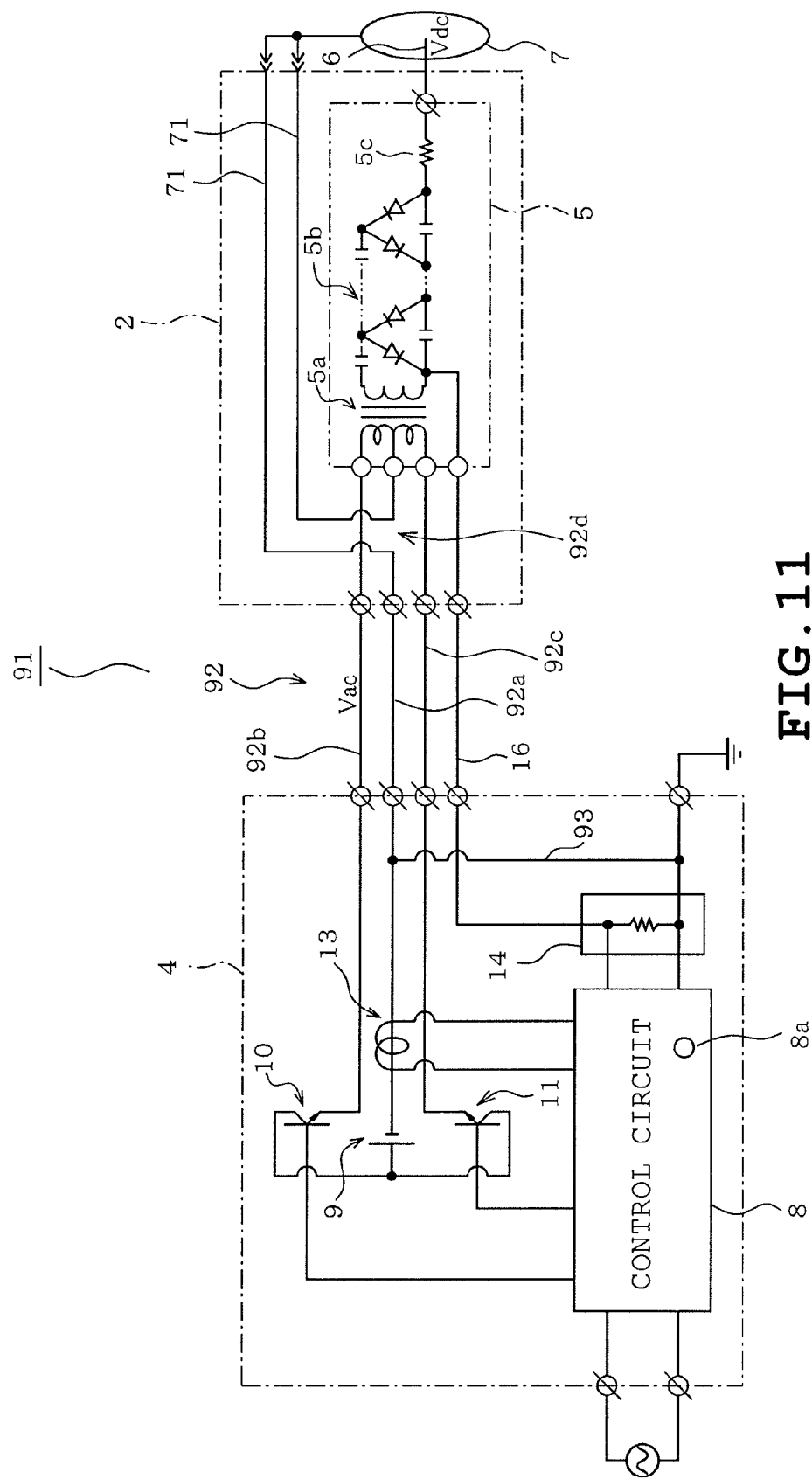
FIG. 11 is a view similar to FIG. 1, showing a second embodiment.

A second embodiment of the invention will be described with reference to FIG. 11. In the first embodiment, AC voltage Vac is supplied via the two power feed cables (power lines 3a and 3b) to the spray gun 2. Differing from the first embodiment, the second embodiment provides the configuration of supplying AC voltage Vac via three power feed cables (power lines) to the spray gun 2. Only the differences between the first and second embodiments will now be described.

In the electrostatic coating system 91 of the embodiment, the output of the DC power supply 9 of the AC power supply 4 is connected by the switching element 10 so as to be positive relative to the ground potential and by the switching element 11 so as to be negative relative to the ground potential. When the switching elements 10 and 11 are alternately turned on/off repeatedly according to a pulse width of the drive signal delivered from the control circuit 8, the low AC voltage $V_{ac}$ (AC 24 V/20 kHz) according to the output voltage of the DC power supply 9 is generated. The AC voltage Vac is supplied to the high voltage generator 5 of the spray gun 2 via the power supply line 92 (serving as an AC voltage supply line) employed instead of the power supply line 3 in the first embodiment.

The power supply line 92 includes three power lines 92a, 92b and 92c to supply the AC voltage Vac to the high voltage generator 5 of the spray gun 2. The power line 92a (serving as a ground side supply line) is employed instead of the above-described power supply line 3 and is grounded via a ground line 93 at the power supply 4 side, thereby being maintained at the ground potential. On the other hand, the power lines 92b and 92c are employed instead of the above-described power line 3b and have respective potentials varying relative to the power line 92a. The power line 92a includes a part (provided inside the spray gun 2) formed with the open circuit 92d. A pair of power feeding and grounding paths 71 are connected to the open circuit 92d.

The current coil 13 is provided on the power line 92a. Based on the current detected by the current coil 13, the control circuit 8 configured to control supply of AC voltage $V_{ac}$ via the power line 92 (power lines 92a, 92b and 92c) in the same manner as in the first embodiment. More specifically, when the detection current is reduced during supply of AC voltage $V_{ac}$ to the high voltage generator 5 or when the attachment of the grounding ring 7 to the gun body 21 is uncertain, the control circuit 8 stops supply of AC voltage $V_{ac}$ to the high voltage generator 5. Furthermore, the control circuit 8 also stops supply of AC voltage $V_{ac}$ to the high voltage generator 5 when the grounding ring 7 is completely detached from the gun body 21.

In the second embodiment described above, too, the supply of AC voltage $V_{ac}$ is immediately stopped when the attachment of the grounding ring 7 to the gun body 21 is uncertain or when the grounding ring 7 is completely detached form the gun body 21. Consequently, the grounding ring 7 can reliably be prevented from being electrically charged during the coating work even when the grounding ring 7 is configured to be detachably attachable to the gun body 21, whereupon the safety of the coating work can be improved.

Other Embodiments

The invention should not be limited by the foregoing embodiments but can be modified or expanded as follows.

The AC power supply 4 may be provided inside the spray gun 2, instead of outside the spray gun 2.

The control circuit 8 may detect voltage of the power line 3 or 92 by the current coil 13. In this case, the control circuit 8 controls supply of AC voltage $V_{ac}$ via the power line 3 or 92 to the high voltage generator 5, based on the detection voltage detected by the current coil 13. More specifically, the control circuit 8 is configured to stop supply of AC voltage $V_{ac}$ when the detection voltage drops during supply of AC voltage to the high voltage generator 5 (when the attachment of the grounding ring 7 to the gun body 21 is uncertain) or when no voltage is detected (when the grounding ring 7 is completely detached form the gun body 21.

The AC voltage supply line should not be limited to the above-described power lines 3 and 92 but may be constituted by a mere electrical wire (which does not serve to supply electric power).

The control circuit 8 detects the current flowing through the power line 3 or 92 as described above. The interval (a predetermined time period) of the current detection by the control circuit 8 is preferably set to several msec. Furthermore, an interval (a predetermined time period) of voltage detection with respect to the voltage of the power line 3 or 92 is preferably set to several msec. When the detection interval is set to several msec., the AC voltage Vac does not rise to a large degree in this period. Accordingly, even when the contact of the connecting terminals 61 (the grounding ring 7) with the respective sockets 74 (the gun body 21) is uncertain, there is less possibility that spark occurs between the connecting terminals 61 and the sockets 74. When the detection interval is set to several hundred msec. (100 msec., for example), the AC voltage $V_{ac}$ rises to a large degree in the interval period. Accordingly, when the contact of the connecting terminals 61 with the sockets 74 is uncertain, spark tends to easily occur between the connecting terminals 61 and the sockets 74.

The grounding ring 7 should not be limited to the conductive member with only the front end having the semi-circular section. The shape of the grounding ring 7 may suitably be changed. For example, the grounding ring 7 may comprise an annular conductive member having a circular section or having a rectangular section. Furthermore, the grounding ring 7 should not be limited to the annular conductive member. The grounding ring 7 may comprise an elliptically annular conductive member. The grounding member should not be limited to the ring shape but may be spherical, for example.

The connecting portion should not be limited to the paired connecting terminals 61 but may comprise a single terminal having bifurcated distal ends. Furthermore, the grounding member may directly be connected to the ground side power supply line without use of the connecting portions. In short, the electrostatic coating system may be configured so that the open circuit of the ground side supply line maintained at the ground potential while the grounding member is attached to the gun body 21.

Furthermore, the connected portion should not be limited to the paired sockets 74. For example, the connecting portion may comprise a single pin-like member and connected members may be provided so as to contact two portions of the pin-like member respectively.

The coating material tube 46 may extend into a spiral shape or a linear shape according to type of coating material to be used, for example.

The coating material usable in the invention should not be limited to the above-described solvent-type coating material. For example, metallic coating materials can be used.

The invention is applicable to an electrostatic coating system provided with an electrostatic coating spray gun which does not discharge patterned air. In short, the invention is applicable to electrostatic coating systems provided with respective electrostatic coating spray guns which coat the object with electrically charged coating material.

EXPLANATION OF REFERENCE SYMBOLS

Reference symbol 1 designates an electrostatic coating system, 2 an electrostatic coating spray gun, 3 a power supply line (AC voltage supply line), 3a a power supply line (a ground side supply line), 3c an open circuit, 4 an AC power supply, 5 a high voltage generator (high voltage generation unit), 6 a pin electrode (an electrode), 7 a grounding ring (a ground body), 8 a control circuit (a control unit), 8a a reset switch (a return unit), 13 a current coil (a detection unit), 21 a gun body, 61 connecting terminals (connecting portions, terminals), 61c a pressing portion, 74 sockets, (connected portions), 91 an electrostatic coating system, 92 power supply lines (AC voltage supply lines), 92a a power supply line (a ground side supply line) and 92d an open circuit.

The invention claimed is:

1. An electrostatic coating system which includes an electrostatic coating spray gun atomizing an electrically charged coating material and applying the atomized coating material to an object to be coated and an alternating-current (AC) power supply generating alternating voltage, the electrostatic coating spray gun comprising:
a gun body made of a non-conductive material;
a voltage generation unit generating a direct-current (DC) voltage based on AC voltage supplied thereto via an AC voltage supply line from the AC power supply;
an electrode to which the DC voltage generated by the voltage generating unit is applied for charging the coating material to be atomized; and
a grounding member detachably attached to the gun body and provided so as to be spaced from the electrode when attached to the gun body, the grounding member having a conductive property such that the grounding member generates an electric field between the electrode to which the DC voltage is applied and the grounding member, the AC power supply comprising:
a detection unit which detects a current flowing via the AC voltage supply line or voltage of the AC voltage supply line; and
a control unit which controls supply of the AC voltage via the AC voltage supply line to the voltage generation unit, based on the detected current or detected voltage, wherein the AC voltage supply line includes a ground side supply line which is grounded, the ground side supply line including a part formed with an open circuit;
wherein the grounding member is configured to close the open circuit when attached to the gun body; and
wherein the control unit is configured to stop supply of the AC voltage to the voltage generation unit when the detected current or the detected voltage is reduced while supplying the AC voltage to the voltage generation unit or when the current or the voltage is not detected.

2. The electrostatic coating system according to claim 1, wherein the AC power supply includes a recovery unit which recovers the supply of AC voltage to the voltage generation unit after the control unit has stopped the supply of the AC voltage to the voltage generation unit.

3. The electrostatic coating system according to claim 1, wherein in the electrostatic coating spray gun, the grounding member is provided with a connecting portion having conductivity, the gun body is provided with a connected portion connected to both ends of the open circuit of the ground side supply line, and attachment of the grounding member to the gun body is carried out by fitting of the connecting portion with the connected portion.

4. The electrostatic coating system according to claim 3, wherein in the electrostatic coating spray gun, the grounding member is provided with a pair of terminals as the connecting portion, and the gun body is provided with a pair of sockets, as the connected portion, connected to both ends of the open circuit of the ground side supply line.

5. The electrostatic coating system according to claim 4, wherein the pair of terminals have pressing portions which press inner surfaces of the respective pair of sockets.

6. An electrostatic coating spray gun which atomizes an electrically charged coating material and applies the atomized coating material to an object to be coated and constitutes an electrostatic coating system together with an alternating-current power source unit generating alternating voltage, the spray gun comprising:
a gun body made of a non-conductive material;
a voltage generation unit generating a direct-current (DC) voltage based on the alternating-current (AC) voltage supplied thereto via an AC voltage supply line from the AC power source unit;
an electrode to which the DC voltage generated by the voltage generating unit is applied for charging the coating material to be atomized; and
a grounding member detachably attached to the gun body and provided so as to be spaced from the electrode when attached to the gun body, the grounding member having a conductive property such that the grounding member generates an electric field between the electrode to which the DC voltage is applied and the grounding member, wherein:

the AC voltage supply line includes a ground side supply line to which grounding is applied, the ground side supply line including a part formed with an open circuit; and the grounding member is configured to close the open circuit when attached to the gun body.

7. The electrostatic coating system according to claim 2, wherein in the electrostatic coating spray gun, the grounding member is provided with a connecting portion having conductivity, the gun body is provided with a connected portion connected to both ends of the open circuit of the ground side supply line, and attachment of the grounding member to the gun body is carried out by fitting of the connecting portion with the connected portion.

8. The electrostatic coating system according to claim 7, wherein in the electrostatic coating spray gun, the grounding member is provided with a pair of terminals as the connecting portion, and the gun body is provided with a pair of sockets, as the connected portion, connected to both ends of the open circuit of the ground side supply line.

9. The electrostatic coating system according to claim 8, wherein the pair of terminals have pressing portions which press inner surfaces of the respective pair of sockets.

* * * * *